United States Patent
Gibson et al.

(10) Patent No.: US 8,473,172 B2
(45) Date of Patent: Jun. 25, 2013

(54) SYSTEM AND METHODS FOR ASSISTED DIRECT START CONTROL

(75) Inventors: Alex O'Connor Gibson, Ann Arbor, MI (US); Roger Lyle Huffmaster, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 722 days.

(21) Appl. No.: 12/348,193

(22) Filed: Jan. 2, 2009

(65) Prior Publication Data

US 2010/0174465 A1 Jul. 8, 2010

(51) Int. Cl.
| | | |
|---|---|---|
| *G06F 7/70* | (2006.01) | |
| *G06F 7/00* | (2006.01) | |
| *B60T 7/12* | (2006.01) | |
| *F16H 47/06* | (2006.01) | |
| *F16H 61/20* | (2006.01) | |
| *B60W 10/04* | (2006.01) | |
| *F02N 11/08* | (2006.01) | |
| *F02M 3/00* | (2006.01) | |

(52) U.S. Cl.
USPC ............ 701/70; 701/51; 701/53; 701/54; 701/55; 701/67; 701/68; 701/82; 701/90; 701/95; 477/38; 477/107; 477/111; 477/174; 477/181; 123/179.4; 123/339.1

(58) Field of Classification Search
USPC .......... 701/51, 53–55, 67, 68, 70, 82–87, 701/90, 95; 477/38, 107, 111, 174, 180, 181; 123/179.4, 339.1
See application file for complete search history.

(56) References Cited

U.S. PATENT DOCUMENTS

| | | | | |
|---|---|---|---|---|
| 6,054,844 | A * | 4/2000 | Frank ....................... | 322/16 |
| 6,093,974 | A | 7/2000 | Tabata et al. | |
| 6,258,008 | B1 | 7/2001 | Tabata et al. | |
| 6,278,916 | B1 * | 8/2001 | Crombez .................. | 701/22 |
| 6,411,881 | B1 * | 6/2002 | Thomas .................... | 701/67 |
| 6,730,000 | B1 * | 5/2004 | Leising et al. ........... | 477/110 |
| 7,130,731 | B2 * | 10/2006 | Itoh et al. ................. | 701/54 |
| 7,449,793 | B2 * | 11/2008 | Cho et al. ................. | 290/1 A |
| 7,610,143 | B1 * | 10/2009 | Boesch .................... | 701/112 |
| 2002/0086772 | A1 * | 7/2002 | Abe et al. ................ | 477/102 |
| 2002/0179047 | A1 * | 12/2002 | Hoang et al. ............ | 123/350 |
| 2003/0171868 | A1 * | 9/2003 | Morishita et al. ........ | 701/54 |
| 2004/0127326 | A1 * | 7/2004 | Tajima et al. ............ | 477/3 |
| 2005/0080523 | A1 * | 4/2005 | Bennett et al. .......... | 701/22 |
| 2006/0111823 | A1 * | 5/2006 | Tamai ....................... | 701/38 |
| 2006/0137920 | A1 * | 6/2006 | Aoki et al. ............... | 180/65.2 |
| 2006/0189436 | A1 * | 8/2006 | Nakashima et al. ..... | 477/174 |
| 2008/0029331 | A1 * | 2/2008 | Schiele .................... | 180/338 |

FOREIGN PATENT DOCUMENTS

EP 1348895 3/2003

\* cited by examiner

*Primary Examiner* — Mary Cheung
*Assistant Examiner* — Majdi Alsomiri
(74) *Attorney, Agent, or Firm* — Julia Voutyras; Alleman Hall McCoy Russell & Tuttle LLP

(57) ABSTRACT

Systems and methods for assisted direct start control are provided. An example method varies engine torque, forward clutch engagement pressure, and wheel brake pressure during a vehicle launch responsive to longitudinal vehicle grade to improve launch performance.

19 Claims, 6 Drawing Sheets

SYSTEM AND METHODS FOR ASSISTED
DIRECT START CONTROL

FIELD

The present application relates to methods and systems for controlling automatic re-start of an engine in a vehicle.

BACKGROUND AND SUMMARY

Vehicles have been developed to perform idle-stop when idle-stop conditions are met and automatically re-start the engine when re-start conditions are met. A number of methods may be used to enable a smooth launch control of the automatic transmission when re-start conditions are met. In one example, the vehicle may be started in a "Drive" gear and further coordination of an engine rotation speed and an engagement state of one or more forward clutches may enable vehicle launch with minimal "lurching".

One such example of a vehicle re-start and launch method is illustrated by Katou et al. in EP 1,348,895A2. Herein, a method is described for a smooth launch control of an automatic transmission vehicle using a hydraulic system and by detecting an engagement pressure of the forward clutch. Specifically, if the engagement pressure is below a predetermined value, an engine torque reduction is commanded by an electronic controller 12 until the desired forward clutch engagement pressure is reached. The method also enables an adaptive control of the timing of an initial engine combustion based on a time to the predetermined forward clutch engagement pressure.

However, the inventors herein have recognized potential issues with such an approach. As one example, modulation of the forward clutch during a majority of automatic re-starts may lead to excessive wear of the forward clutch. As another example, if the system is tuned for level grades, insufficient driveline torque may be generated when the vehicle is launched on a grade.

Thus in one example, some of the above issues may be addressed by a method for controlling a system including an engine. The method may include operating in a first mode during a first vehicle grade and during automatic re-starting from an engine stopped condition. The first mode may include starting the engine in a driving gear, and adjusting engine torque responsive to launch behavior. The method may further include operating in a second mode during a second vehicle grade and during automatic re-starting from an engine stopped condition. The second mode may include starting the engine in the driving gear, and adjusting one or more of a transmission forward clutch and wheel brakes responsive to launch behavior.

In this way, it is possible to reduce clutch wear while also addressing the issue of consistent launch performance on various grades. For example, in one example, on lower grades, fuel economy concerns may drive the selection of engine torque modulation as the driveline torque modulator. In such a case, engine torque may be adjusted responsive to vehicle launch behavior, such as vehicle speed, engine speed, and clutch pressure, etc. By using at least engine torque modulation for automatic re-starting on lower grades, forward clutch degradation as well as brake caliper wear may be reduced. In another example, on steeper grades, coordinated adjustment of the forward clutch and/or wheel brakes responsive to vehicle launch behavior, including vehicle speed, engine speed, clutch pressure, and other control parameters, may be used to modulate driveline torque during the automatic re-start. Thus, by considering longitudinal vehicle grade, a smoother launch may be achieved more consistently, across a range of grades, while reducing wear of the forward clutch and brake caliper. Further, fuel economy benefits of the vehicle may also be achieved by selectively using engine torque modulation under certain conditions, and forward clutch modulation and/or wheel brake modulation under other conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF FIGURES

A system and methods for assisted direct start control are provided. Thus in one example, some of the above issues may be addressed by a method for controlling a system including an engine.

The method may include operating in a first mode during a first vehicle grade and during automatic re-starting from an engine stopped condition, where the first mode includes starting the engine in a driving gear, and adjusting engine torque responsive to launch behavior. The method may further include operating in a second mode during a second vehicle grade and during automatic re-starting from an engine stopped condition. The second mode may include starting the engine in the driving gear, and adjusting one or more of a transmission forward clutch and wheel brakes responsive to launch behavior; in one example method, the first vehicle grade may be lower than the second vehicle grade. Further still, the method may include selecting modes based on brake caliper wear.

The present application may be able to improve fuel economy by controlling driveline torque during an automatic re-start by modulating engine combustion torque when the vehicle is on low grade surfaces (e.g., on a relatively flat surface or facing downwards on a hill), whereas the transmission forward clutch (herein referred to as forward clutch) and/or wheel brakes can be used to control driveline torque and vehicle motion when the vehicle is on more graded surfaces. By using such a method, a time to a brake caliper wear threshold (e.g., when brake calipers need to be replaced) may be increased.

Figure 1:
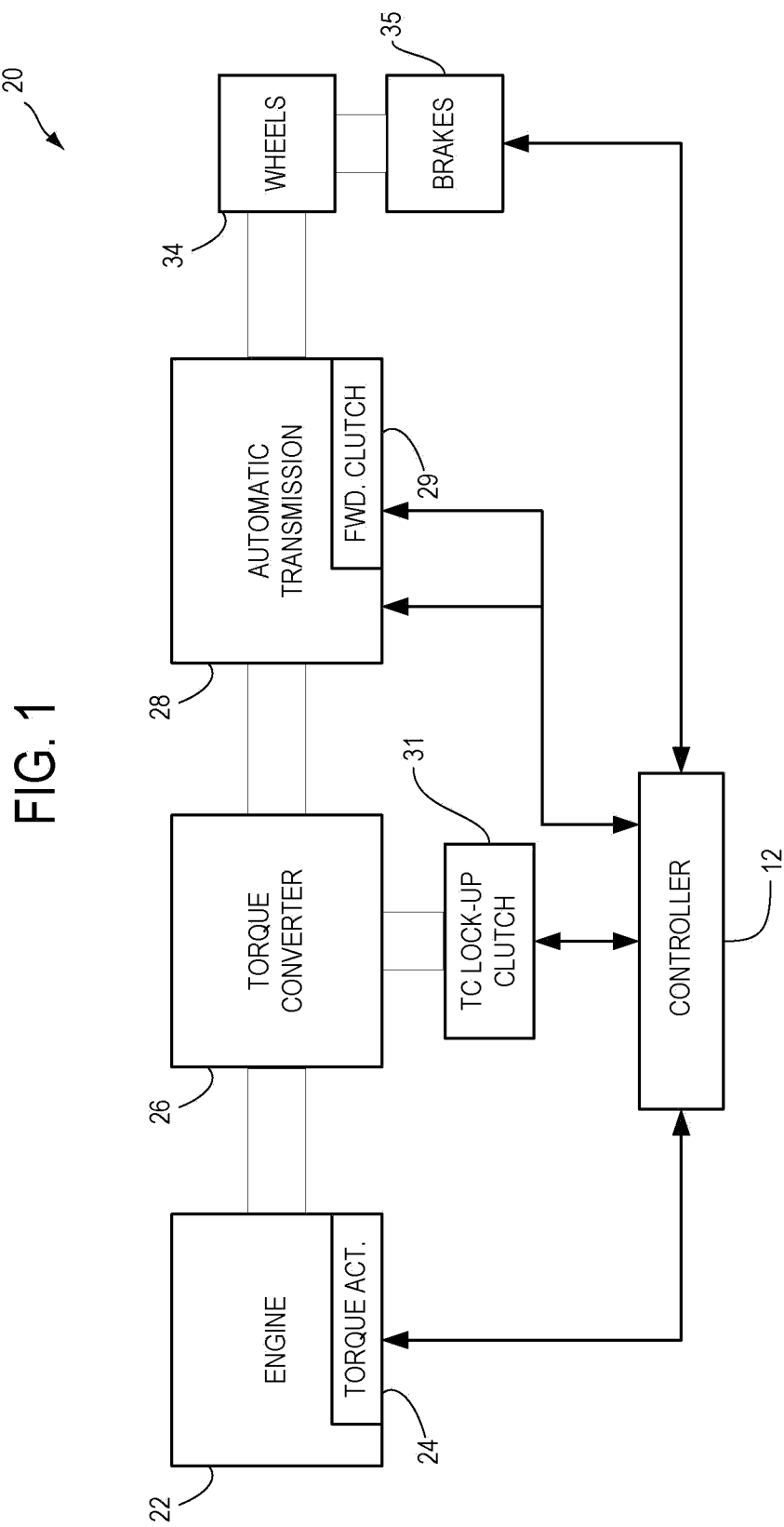
FIG. 1 is a block diagram schematic of an embodiment of a vehicle drivetrain.
Figure 2:
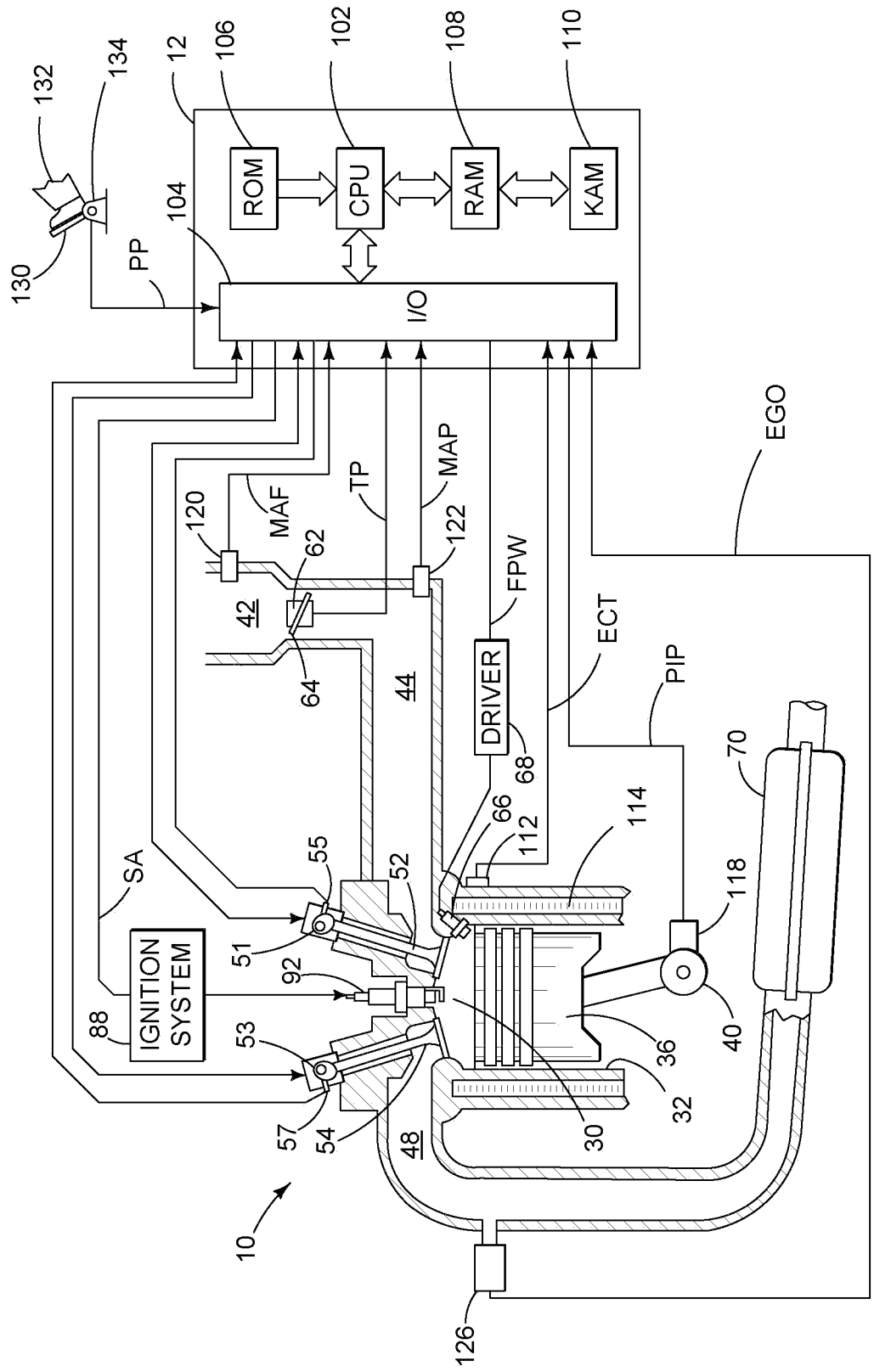
FIG. 2 is a schematic view of a direct injection engine with cam actuation systems.
Figure 3:
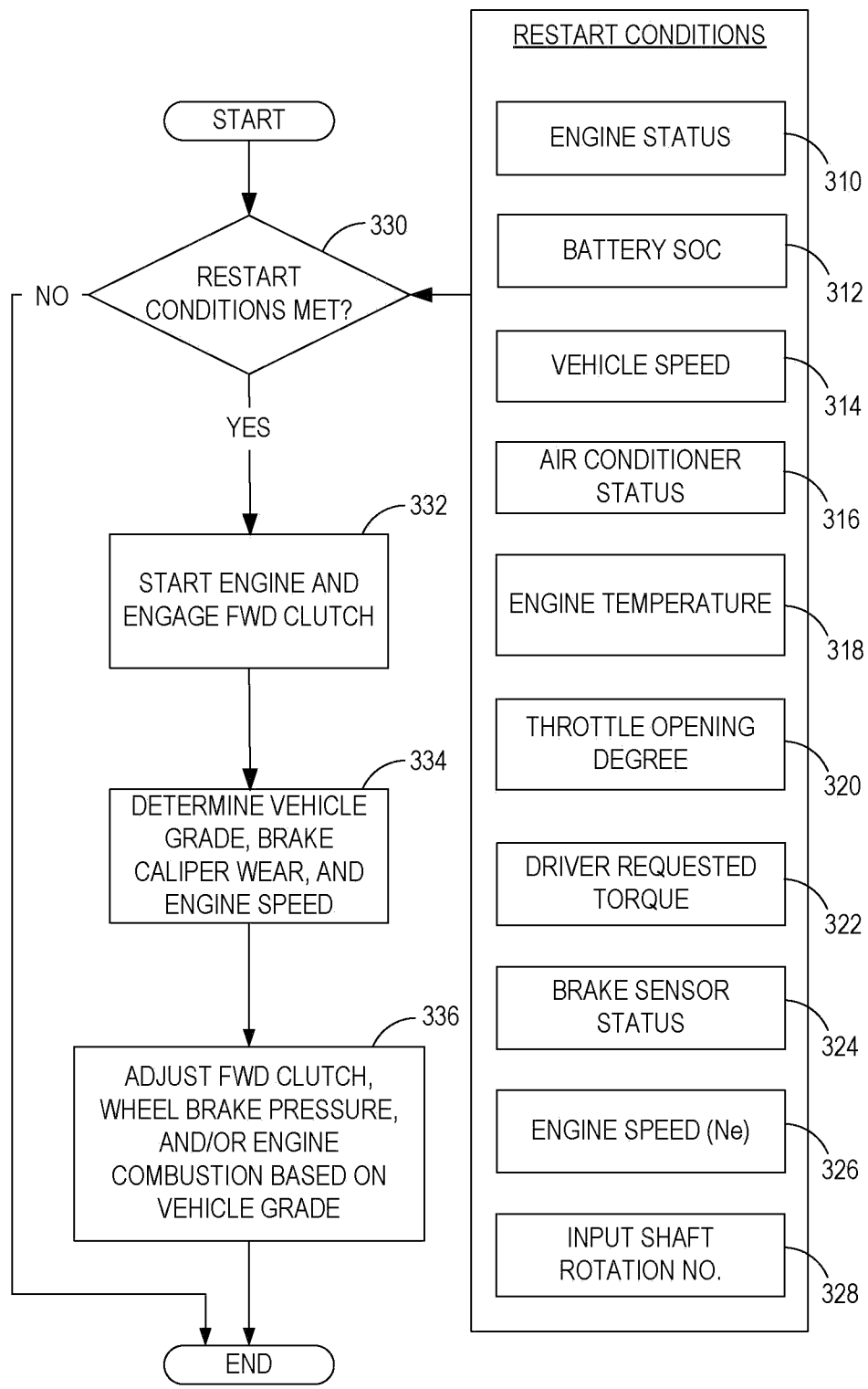
FIGS. 3-4 are flowcharts for a method for operating a vehicle with an engine, including adjusting driveline torque during an automatic re-start based on longitudinal vehicle grade.
Figure 4:
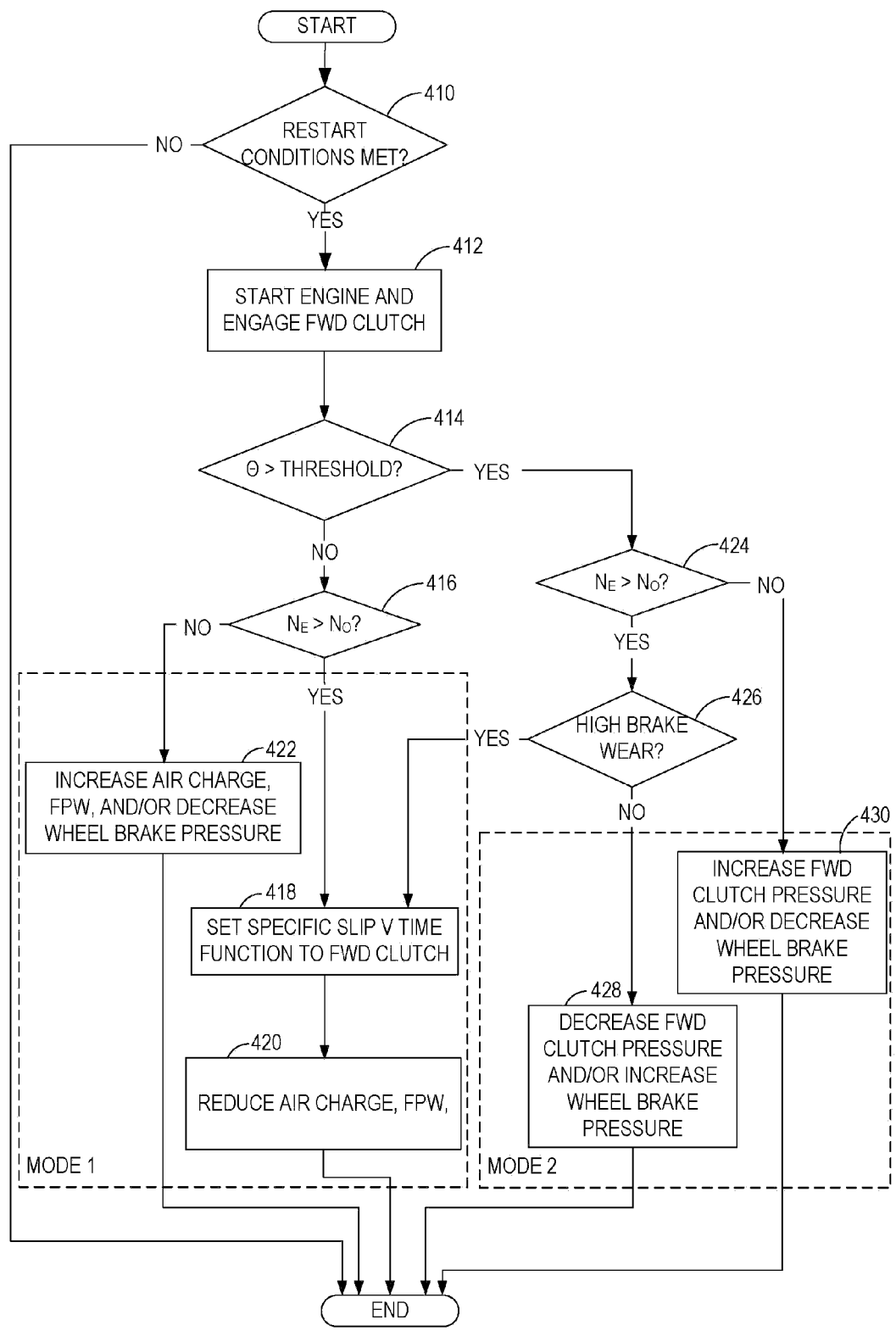
Figure 5:
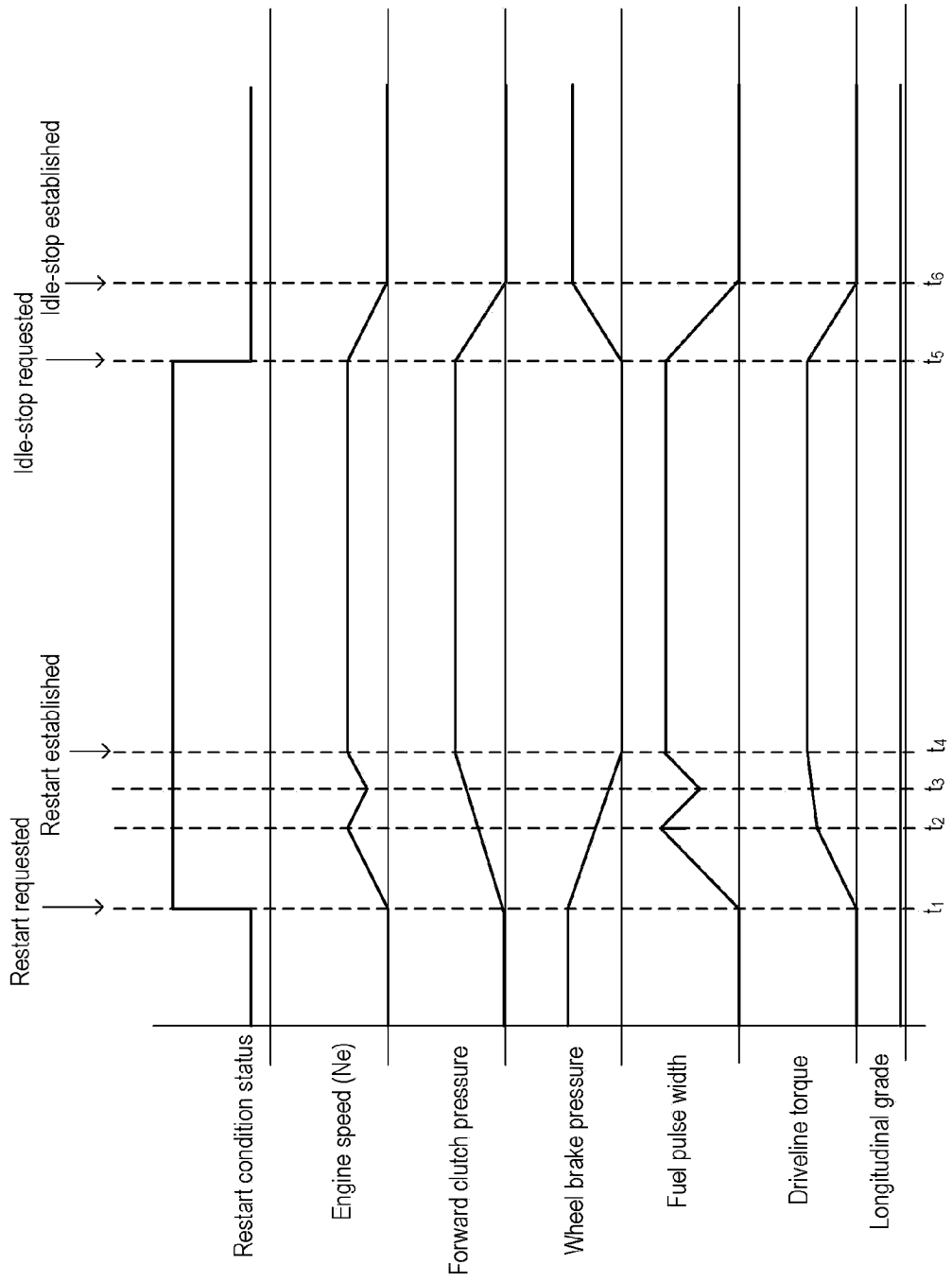
FIG. 5 is a series of graphs illustrating example operation of a first operating mode.
Figure 6:
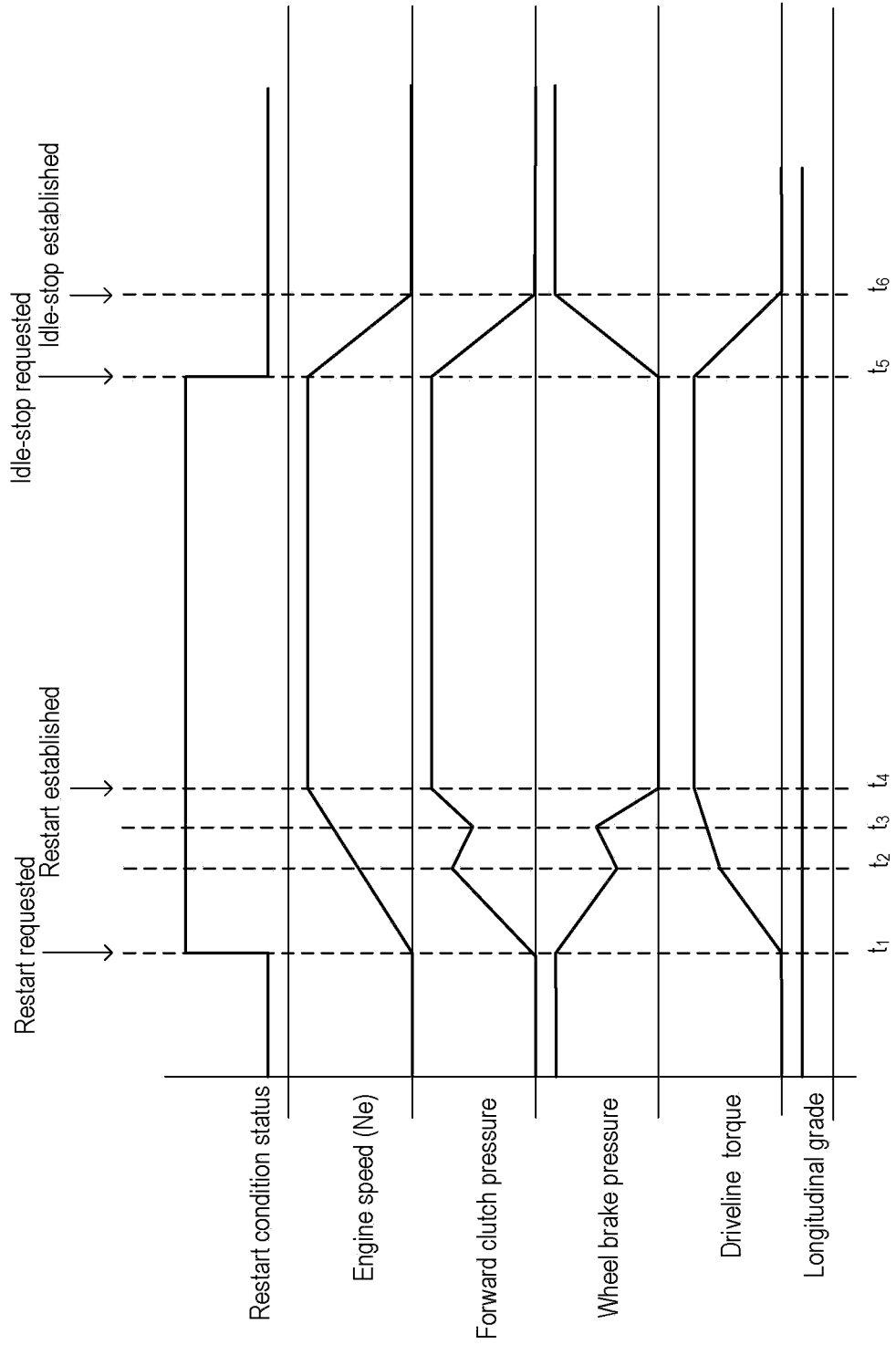
FIG. 6 is a series of graphs illustrating example operation of a second operating mode.

FIG. 1 shows an example block diagram of a system of a vehicle that may control driveline torque by selectively controlling various components of the vehicle drivetrain. FIG. 2 shows a detailed schematic of an engine of the system including a cylinder with direct injection. FIG. 3 illustrates a high-level flowchart for an example method for controlling driveline torque in a system such as that of FIG. 1. FIG. 4 further illustrates an example method for selecting a first operating mode wherein engine combustion is adjusted during an automatic re-start, or a second operating mode wherein forward clutch engagement pressure and/or wheel brake pressure is adjusted during an automatic re-start, based on longitudinal vehicle grade (herein referred to as grade) and/or brake caliper wear. Accordingly, FIG. 5 shows an example of a vehicle operating in the first operating mode during an automatic re-start and FIG. 6 shows an example of the vehicle operating in the second operating mode during an automatic re-start.

Referring now to FIG. 1, a block diagram of a system 20 of a vehicle is shown. The system 20 may be powered by an engine 22. In one example, the engine 22 may be a gasoline engine. In alternate embodiments, other engine configurations may be employed, for example a diesel engine. Engine 22 may be started with an engine starting system (not shown). Further, engine 22 may generate or adjust torque via torque actuator 24 (e.g., fuel injector, throttle, etc.). Engine 22 may further include an auxiliary starter system (not shown) to support engine re-start at near zero engine speed, for example at 50 RPM.

Engine torque may be transmitted to torque converter 26 to drive an automatic transmission 28 by engaging one or more clutches, including forward clutch 29. In some examples, the torque converter 26 may be referred to as a component of the automatic transmission 28. The output of the torque converter 26 may in turn be controlled by torque converter lock-up clutch 31. As such, when torque converter lock-up clutch 31 is fully disengaged, torque converter 26 may transmit torque to automatic transmission 28 via fluid transfer between the torque converter turbine and torque converter impeller, thereby enabling torque multiplication. In contrast, when torque converter lock-up clutch 31 is fully engaged, the engine output torque is directly transferred via the torque converter to an input shaft (not shown) of automatic transmission 28. Alternatively, the torque converter lock-up clutch 31 may be partially engaged, thereby enabling the amount of torque relayed to the automatic transmission 28 to be adjusted. An electronic controller 12 may be configured to adjust the amount of torque transmitted by the torque converter 26 by adjusting the torque converter lock-up clutch 31 in response to various engine operating conditions, or based on a driver-based engine operation request.

Torque output from the automatic transmission 28 may in turn be relayed to wheels 34 to propel the vehicle. Specifically, automatic transmission 28 may adjust an input driving torque at the input shaft (not shown) responsive to a vehicle traveling condition before transmitting an output driving torque to the wheels 34.

Further, wheels 34 may be locked by engaging wheel brakes 35. In one example, wheel brakes 35 may be engaged in response to the driver pressing his foot on a brake pedal. In the same way, wheels 34 may be unlocked by disengaging wheel brakes 35 in response to the driver releasing his foot from the brake pedal.

An electronic controller 12 may be configured to receive a plurality of engine operating parameters from engine 22 (e.g., air charge, engine temperature, engine speed, engine torque), torque converter lock-up clutch 31 (e.g., engagement pressure, torque converter slip), automatic transmission 28 (e.g., forward clutch engagement pressure, automatic transmission output torque), wheels 34 (e.g. driveline speed, driveline torque), wheel brakes 35 (e.g., caliper wear), and a grade sensor (e.g., a gyroscope may measure longitudinal vehicle grade, an accelerometer may measure longitudinal vehicle acceleration, or grade may be estimated based on other vehicle parameters). The electronic controller 12 may then estimate grade based on input from various sensors, one of which may be a grade sensor. Brake caliper wear may also be estimated by the electronic controller 12 based on input from various sensors. The electronic controller 12 may accordingly control a torque output of the engine 22, operation of the torque converter 26 via the torque converter lock-up clutch 31, operation of the forward clutch 29 and/or wheel brakes 35. As one example, described more fully below, in the case of a gasoline engine, an engine torque output may be controlled by adjusting a combination of air charge, fuel pulse width, fuel pulse timing, and/or spark timing, by controlling throttle opening and/or valve timing, valve lift and/or boost for turbo- or super-charged engines. In the case of a diesel engine, electronic controller 12 may adjust the engine torque output by adjusting one or more of air charge and fuel pulse width, for example. In all cases, engine control may be performed on a cylinder-by-cylinder basis to control the engine torque output.

As will be described herein, the electronic controller 12 may communicate with the TC lock-up clutch 31 such that the TC lock-up clutch 31 is, in one example, partially engaged when the forward clutch 29 is engaged. Further, the electronic controller 12 may engage the forward clutch 29 and/or release the wheel brakes 35 when, for example, automatic re-start conditions are met.

Referring now to FIG. 2, a schematic diagram shows one cylinder of multi-cylinder engine 10, which may be included in a propulsion system of a vehicle. Engine 10 may be controlled at least partially by a control system including electronic controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate automatic transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by electronic controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from electronic controller 12 via electronic driver 68. In this manner, fuel injector 66 provides what is known as direct injection of fuel into combustion chamber 30. The fuel injector may be mounted on the side of the combustion chamber or in the top of the combustion chamber, for example. Fuel may be delivered to fuel injector 66 by a fuel delivery system (not shown) including a fuel tank, a fuel pump, and a fuel rail. In some embodiments, combustion chamber 30 may alternatively or additionally include a fuel injector arranged in intake passage 42 in a configuration that provides what is known as port injection of fuel into the intake port upstream of combustion chamber 30.

Intake passage 42 may include a throttle 62 having a throttle plate 64. In this particular example, the position of throttle plate 64 may be varied by electronic controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to electronic controller 12 by throttle position signal TP. Intake passage 42 may include a mass air flow sensor 120 and a manifold air pressure sensor 122 for providing respective signals MAF and MAP to electronic controller 12.

Ignition system 88 can provide an ignition spark to combustion chamber 30 via spark plug 92 in response to spark advance signal SA from electronic controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of catalytic converter 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. The exhaust system may include light-off catalysts and underbody catalysts, as well as exhaust manifold, upstream and/or downstream air-fuel ratio sensors. Catalytic converter 70 can include multiple catalyst bricks, in one example. In another example, multiple emission control devices, each with multiple bricks, can be used. Converter 70 can be a three-way type catalyst in one example.

Electronic controller 12 is shown in FIG. 2 as a microcomputer, including microprocessor 102, input/output ports 104, an electronic storage medium for executable programs and calibration values shown as read-only memory 106 in this particular example, random access memory 108, keep alive memory 110, and a data bus. The electronic controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from manifold air pressure sensor 122. Storage medium read-only memory 106 can be programmed with computer readable data representing instructions executable by microprocessor 102 for performing the methods described below as well as variations thereof.

As described above, FIG. 2 shows one cylinder of a multi-cylinder engine, and each cylinder may similarly include its own set of intake/exhaust valves, fuel injector, spark plug, etc.

A method for controlling automatic re-start is shown in FIG. 3. The engine re-start conditions may include, but are not limited to, the engine status 310 being idle-stop, battery state of charge 312 below a predetermined threshold, vehicle speed 314 below a predetermined threshold, air conditioner status 316 on, engine temperature 318 below a desired temperature, throttle opening degree 320 increase, and an emission control device temperature below threshold, as some examples. Further, re-start conditions may include driver requested torque 322 being greater than a threshold, brake sensor status 324 indicating a release of a brake pedal, an increase in engine speed 326, or a predetermined level of input shaft rotation 328.

If re-start conditions are met at 330, the engine may be started in Drive gear wherein the forward clutch may be partially or fully engaged at 332. Grade, brake caliper wear, and engine speed are then determined at 334, and forward clutch engagement pressure, wheel brake pressure and/or engine combustion may be adjusted at 336 based on grade and caliper wear, for example. Thus, a method for selecting an operating mode may be based on grade and/or based on brake caliper wear.

If re-start conditions are not met at 330, the routine may end. It may be appreciated that other controls may be included, for example, adjustments to a torque converter lock-up clutch. Example modes of control are further described with respect to FIG. 4.

Referring now to FIG. 4, if re-start conditions are met at 410, the engine 22 may be started in Drive gear and the forward clutch 29 may be partially or fully engaged at 412. At 414, it may be determined if the grade θ is above a predetermined grade threshold. If the answer is no (e.g., the vehicle is on a low grade surface) it is determined if actual engine speed $N_E$ is greater than a desired engine speed $N_O$ at 416. If the answer is yes at 416 (e.g., engine speed is above a predetermined high threshold), a first operating mode may be selected, wherein a specific forward clutch slip versus time function is set (e.g., zero slip) 418 and engine combustion is reduced 420. There are several methods by which engine combustion may be reduced including reducing air charge, fuel pulse width, fuel pulse timing, and/or modulating spark timing. In this example, wheel brake pressure is not shown as being modulated at 420, but it may also be increased concurrent with reducing engine combustion, to reduce driveline torque, for example. Thus, in the first operating mode, engine torque may be decreased responsive to engine speed above a predetermined high threshold, thereby reducing risk of vehicle lurch behavior. In this example, adjustments to the driveline torque are made based on engine speed, though the adjustments may also be made based on engine torque output, wheel speed, and/or vehicle acceleration, as some examples.

If $N_E$ is not greater than $N_O$ at 416 and $N_E$ is less than $N_O$ (e.g., engine speed is below a predetermined low threshold), the first operating mode may be selected wherein engine combustion may be increased at 422 (e.g., increase air charge, increase fuel pulse width) and the wheel brake pressure may be decreased. Thus, in the first operating mode, engine torque may be increased responsive to engine speed below a low predetermined threshold to achieve desired engine torque. Example control of the first operating mode is further illustrated in FIG. 5.

Referring again to FIG. 4, if the answer is yes at 414, (e.g., the vehicle is facing upward on a hill) it is determined if the actual vehicle speed $N_E$ is above the desired vehicle speed $N_O$ 424. If $N_E$ is greater than $N_O$ (e.g., engine speed is above a predetermined high threshold), and brake caliper wear is not high 426, a second operating mode may be selected wherein forward clutch engagement pressure may be decreased thereby increasing the forward clutch slip, and wheel brake pressure may be concurrently increased, as shown at 428 in this example.

Alternately, if the brake caliper wear is high at 426 (e.g., brake caliper wear is above a predetermined wear threshold), the first operating mode may be selected wherein a specific slip vs. time function for the forward clutch is set 418 and engine combustion is reduced 420 as described above. The brake caliper wear check at 426 is included such that if brake caliper wear is high and it is desirable to minimize brake caliper wear, the second operating mode may be selected as described, thus reducing brake stress, for example.

If $N_E$ is not greater than $N_O$ at 424 and $N_E$ is less than $N_O$ (e.g., engine speed is below a predetermined low threshold), forward clutch pressure may be increased and/or wheel brake pressure may be decreased at 430. Thus, in the second operating mode forward clutch engagement may be decreased responsive to engine speed above a predetermined high threshold and forward clutch engagement may be increased responsive to engine speed below a predetermined low threshold. Example control of the second operating mode is further illustrated in FIG. 6.

From FIG. 4, it may be appreciated that a method for selecting an operating mode may include selecting a first operating mode if the grade is below a predetermined grade threshold and selecting a second operating mode if the grade is above a predetermined grade threshold. Further, the first operating mode may be selected if the grade is above a predetermined grade threshold and the brake caliper wear is above a predetermined wear threshold. Further, it may be appreciated that the predetermined grade threshold may vary responsive to engine operating parameters (e.g., engine speed, vehicle speed, etc.)

Control of driveline torque via the first or second operating mode allows execution of automatic re-start, smoothly achieving target driveline torque. Further, this can be achieved in a predetermined automatic re-start time, as will be described with respect to FIGS. 5-6.

It may be appreciated that a combination of engine torque modulation, forward clutch pressure modulation, and wheel brake pressure modulation may be selected and utilized for control of automatic re-start, dependent on grade. That is, a combination of operating modes 1 and 2 may be used. For example, when grade is greater than a predetermined grade threshold, the degree of modulation of engine torque (e.g., use of the first operating mode) may be less than the degree of engine torque modulation when grade is less than a predetermined grade threshold, although engine torque modulation is in use in both situations. Similarly, when grade is less than a predetermined grade threshold, the degree of forward clutch modulation and/or wheel brake pressure modulation (e.g., use of the second operating mode) may be less than the degree of forward clutch modulation and/or wheel brake pressure modulation when grade is greater than a predetermined grade threshold, although forward clutch pressure modulation and/or wheel brake pressure modulation may be in use in both situations.

Further, it may be appreciated that, in any automatic re-start operating mode, including the first and second operating modes described above, torque converter lock-up clutch engagement may, additionally, be adjusted responsive to engine speed or other parameters detecting potential lurch behavior. That is, torque converter lock-up clutch engagement may be increased or decreased responsive to engine speed above a predetermined high threshold (dependent on the current level of torque converter lock-up clutch engagement) in both the first and second operating modes. Control of more than one parameter (e.g., forward clutch engagement pressure and wheel brake pressure) may be concurrently or sequentially executed within the selected operating mode.

The degree of regulation to each of these control components (e.g., forward clutch engagement pressure, engine torque, wheel brake pressure) may be learned via adaptive processes such that the electronic controller 12 can accurately predict, and thus prevent, lurch behavior on a wide range of grades. For example, the electronic controller 12 may receive forward clutch engagement pressure, torque converter slip, wheel brake pressure, and engine speed, as some examples, after a lurch incident and calculate thresholds thereof such that if the vehicle reaches said threshold in the future, vehicle lurch behavior can be avoided by adjusting one of a drivetrain parameter.

Further still, it may be appreciated that automatic re-start operating mode may be selected based on engine coolant temperature, torque converter slip speed, automatic transmission output torque, vehicle acceleration, ambient temperature and/or time to achieve launch, as some examples.

An exemplary series of graphs for a vehicle on a relatively flat surface (e.g., low grade) operating in the first operating mode is shown in FIG. 5. When operating in engine shut-down mode (e.g., idle-stop), before t1, the engine speed may be very low, the forward clutch may be disengaged, wheel brake pressure may be high, and thus driveline torque may be zero, as depicted.

When a re-start is requested at t1, forward clutch engagement pressure may be increased with a specific slip versus time function so that the forward clutch is 50% engaged by t2, for example. Concurrently, engine speed may increase as fuel pulse width increases, and wheel brake pressure gradually decreases. In this example, it is detected at t2 that $N_E$ is greater than $N_O$. Because the engine is operating in the first operating mode, driveline torque may be controlled by reducing engine combustion. Accordingly, fuel pulse width decreases at t2 and thus engine speed also decreases. At the same time, wheel brake pressure continues to decrease while forward clutch engagement pressure continues to increase. In this way, driveline torque continues to increase, but at a reduced rate, thereby preventing vehicle lurch behavior. However, it is desirable to achieve target driveline torque and/or target engine speed by t4. Therefore, at t3, the fuel pulse width increases and thus engine speed increases to a target engine speed at t4. Forward clutch engagement pressure also continues to increase so that it is fully engaged by t4 and, likewise, wheel brake pressure is reduced to a minimum value by t4. Thus, target driveline torque may be achieved within a desired re-start time (e.g., between t1 and t4).

In this way, an automatic re-start with a smooth vehicle launch behavior may be achieved by $t_4$. Once re-start has been established (e.g., at t4), the forward clutch may be maintained in an engaged state as depicted. In another example, once the forward clutch has been engaged, the forward clutch engagement pressure may be reduced to a lower value, for example a hold value.

Between t4 and t5, the vehicle may be in Drive gear, for example, until t5 where an idle-stop may be requested. Here, the forward clutch may be disengaged, wheel brake pressure may be increased, and engine speed may be reduced to achieve engine shut-down, as shown.

Referring now to FIG. 6, an exemplary series of graphs for a vehicle on a relatively high grade surface, operating in the second operating mode is shown. When operating in engine shut-down mode (e.g., before t1), the engine speed may be very low, the forward clutch may be disengaged, wheel brake pressure may be high, and thus, driveline torque may be zero, as shown.

When an automatic re-start is requested at t1, as shown in this example, engine speed may be increased with a specific function such that it may reach target engine speed by t4 and engine combustion may not be modulated in a feedback-driven manner during the automatic re-start period between t1 and t4. Between t1 and t2, forward clutch engagement pressure is gradually increased while wheel brake pressure is gradually decreased. This results in an increase in driveline torque during the same interval. At t2, it is detected that $N_E$ is greater than $N_O$. The engine is operating in the second operating mode so the driveline torque may be controlled by modulating forward clutch engagement pressure and/or wheel brake pressure. Accordingly, forward clutch engagement pressure is decreased and wheel brake pressure is increased at t2. At the same time, engine speed continues to increase. In this way, driveline torque continues to increase, but at a reduced rate, thereby preventing vehicle lurch behavior. However, it is desirable to achieve target driveline torque and/or target engine speed by t4. Therefore, the forward clutch engagement pressure is increased at t3 and wheel brake pressure is reduced. Thus, target driveline torque may be achieved within a desired re-start time (e.g., between t1 and t4). After t4, the vehicle may be operated in the same way as described with respect to FIG. 5. Thus, a detailed description is omitted here.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. As such, the subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a system including a vehicle with an engine, comprising:
   operating in a first mode during automatic re-starting from an engine stopped condition when the vehicle is on a surface with a first grade, the first mode including starting the engine in a driving gear, decreasing engine torque responsive to engine speed above a predetermined high threshold, and increasing engine torque responsive to engine speed below a predetermined low threshold;
   operating in a second mode during automatic re-starting from an engine stopped condition when the vehicle is on a surface with a second grade, the second mode including starting the engine in the driving gear, and adjusting one or more of a transmission forward clutch and wheel brakes responsive to engine speed.

2. The method of claim 1, wherein the first grade is lower than the second grade.

3. The method of claim 2 further comprising selecting modes based on brake caliper wear.

4. The method of claim 3 including operating in the first mode during the second grade when the brake caliper wear is greater than a predetermined wear threshold.

5. The method of claim 2 wherein starting the engine in a driving gear includes at least partially engaging the forward clutch to launch the vehicle from rest.

6. The method of claim 2 wherein increasing and decreasing engine torque includes adjusting one or more of air charge, fuel pulse width, and spark timing.

7. The method of claim 6 further comprising, in the second operating mode, decreasing forward clutch engagement responsive to engine speed above the predetermined high threshold and increasing forward clutch engagement responsive to engine speed below the predetermined low threshold.

8. The method of claim 7 further comprising increasing wheel brake pressure responsive to engine speed above the predetermined high threshold and decreasing wheel brake pressure responsive to engine speed below the predetermined low threshold in one or more of the first and second operating modes.

9. The method of claim 1 further comprising adjusting torque converter lock-up clutch engagement during the automatic engine re-starting.

10. A method for a vehicle with an engine and wheel brakes, comprising:
    during automatic re-start from an engine stopped condition,
      starting the engine in a driving gear of an automatic transmission having a forward clutch, and
      adjusting engine torque, forward clutch engagement pressure of the transmission forward clutch, and wheel brake pressure responsive to engine speed and longitudinal grade of a surface on which the vehicle is disposed to smoothly launch the vehicle from rest.

11. The method of claim 10 wherein adjusting engine torque includes adjusting engine torque to a greater extent when the longitudinal grade is below a predetermined grade threshold than when the longitudinal grade is above the predetermined grade threshold.

12. The method of claim 10, wherein adjusting forward clutch engagement pressure includes adjusting forward clutch engagement pressure to a greater extent when the longitudinal grade is above a predetermined grade threshold than when the longitudinal grade is below the predetermined grade threshold.

13. The method of claim 10, wherein adjusting wheel brake pressure includes adjusting wheel brake pressure to a greater extent when the longitudinal grade is above a predetermined grade threshold than when the longitudinal grade is below the predetermined grade threshold.

14. A system for controlling an engine, comprising:
an engine comprising a plurality of cylinders;
an automatic transmission including a forward clutch configured to transmit torque from the engine to wheels;
wheel brakes; and
an electronic controller configured to vary engine torque, to vary forward clutch engagement pressure, and to vary wheel brake pressure during a vehicle launch responsive to engine speed and a longitudinal grade of a surface on which the vehicle is disposed.

15. The system of claim 14 wherein the electronic controller is configured to select an operating mode from a first and a second operating mode, and wherein engagement profiles of engine torque, forward clutch engagement pressure, and wheel brake pressure are responsive to the selected mode, the engagement profile of at least one of the engine torque, forward clutch engagement pressure, and wheel brake pressure differing between the first and second operating modes, and wherein the first operating mode is selected when the longitudinal grade is below a predetermined grade threshold and the second operating mode is selected when the longitudinal grade is above the predetermined grade threshold.

16. The system of claim 15 wherein the predetermined grade threshold is varied responsive to engine operating parameters.

17. The system of claim 16 wherein the operating mode is selected based on brake caliper wear.

18. The system of claim 15 further comprising, in the first operating mode, decreasing engine torque responsive to engine speed above a predetermined high threshold and increasing engine torque responsive to engine speed below a predetermined low threshold, and, in the second operating mode, decreasing forward clutch engagement pressure responsive to engine speed above the predetermined high threshold and increasing forward clutch engagement pressure responsive to engine speed below the predetermined low threshold.

19. The method of claim 18 further comprising increasing wheel brake pressure responsive to engine speed above the predetermined high threshold and decreasing wheel brake pressure responsive to engine speed below the predetermined low threshold, in one or more of the first and second operating modes.

* * * * *